United States Patent
Sharma et al.

(10) Patent No.: US 11,568,137 B2
(45) Date of Patent: Jan. 31, 2023

(54) MAPPING TEXT CONTENT FEEDBACK TO A PROCESS VIA A SYNONYM GRAPH

(71) Applicant: SAP SE, Walldorf (DE)

(72) Inventors: Vishal Sharma, Walldorf (DE); Manu Sinha, Walldorf (DE)

(73) Assignee: SAP SE, Walldorf (DE)

( * ) Notice: Subject to any disclaimer, the term of this patent is extended or adjusted under 35 U.S.C. 154(b) by 246 days.

(21) Appl. No.: 16/782,356

(22) Filed: Feb. 5, 2020

(65) Prior Publication Data
US 2021/0240928 A1    Aug. 5, 2021

(51) Int. Cl.
  G06F 40/247    (2020.01)
  G06F 40/279    (2020.01)
  G06F 16/22     (2019.01)

(52) U.S. Cl.
  CPC .......... *G06F 40/247* (2020.01); *G06F 16/22* (2019.01); *G06F 40/279* (2020.01)

(58) Field of Classification Search
  CPC .... G06F 40/237; G06F 40/247; G06F 40/279; G06Q 30/01
  USPC ........... 704/1, 9, 10; 705/347; 707/763, 723, 707/728, 730, 748, 750, 752
  See application file for complete search history.

(56) References Cited

U.S. PATENT DOCUMENTS

| | | | |
|---|---|---|---|
| 6,167,368 A * | 12/2000 | Wacholder | G06F 40/289 704/9 |
| 7,756,970 B2 | 7/2010 | Ebert et al. | |
| 8,515,828 B1 | 8/2013 | Wolf et al. | |
| 8,554,701 B1 | 10/2013 | Dillard et al. | |
| 8,909,771 B2 | 12/2014 | Heath | |
| 9,092,789 B2 | 7/2015 | Anshul | |
| 9,336,268 B1 * | 5/2016 | Moudy | G06F 40/30 |
| 9,449,080 B1 * | 9/2016 | Zhang | G06F 40/30 |
| 9,799,035 B2 | 10/2017 | Cama et al. | |
| 10,922,340 B1 * | 2/2021 | Yu | G06F 40/279 |
| 2007/0198249 A1 * | 8/2007 | Adachi | G06F 40/205 704/9 |

(Continued)

FOREIGN PATENT DOCUMENTS

| | | |
|---|---|---|
| EP | 1811449 A1 | 7/2007 |
| IN | 01205MU2011 A | 4/2012 |

OTHER PUBLICATIONS

Web Page: "You Can't Possibly Read All of Your Customers' Survey Responses", Text iQ™ Can, Nov. 6, 2019, (7 Pages).

(Continued)

*Primary Examiner* — Martin Lerner
(74) *Attorney, Agent, or Firm* — Buckley, Maschoff & Talwalkar LLC (57) ABSTRACT

Provided are systems and methods for mapping customer feedback to one or more processes. In one example, the method may include receiving text content that includes feedback, mapping, via execution of a mapping algorithm, the text content to a plurality of processes based on a synonym graph, generating mapping values for the plurality of processes, where a mapping value for a process is generated based on distance within the synonym graph of a mapping between a word in the text content and a word identifying the process, and determining a process among the plurality of processes that is most correlated to the feedback based on the generated mapping values.

19 Claims, 10 Drawing Sheets

(56) References Cited

U.S. PATENT DOCUMENTS

| | | | |
|---|---|---|---|
| 2012/0278253 A1* | 11/2012 | Gahlot | G06Q 30/0201 705/347 |
| 2012/0290518 A1* | 11/2012 | Flinn | G06F 16/24575 706/12 |
| 2013/0006975 A1* | 1/2013 | Li | G06F 40/247 707/723 |
| 2013/0024389 A1 | 1/2013 | Gupta | |
| 2013/0238621 A1* | 9/2013 | Ganjam | G06F 16/2465 707/737 |
| 2014/0081626 A1* | 3/2014 | Chang | G06F 40/247 704/9 |
| 2014/0289231 A1* | 9/2014 | Palmert | G06F 40/284 707/723 |
| 2016/0179788 A1* | 6/2016 | Clark | G06F 40/284 704/9 |
| 2017/0046753 A1 | 2/2017 | Deupree | |
| 2017/0235888 A1* | 8/2017 | Rahman | G06F 40/30 705/3 |
| 2017/0337262 A1* | 11/2017 | Smith | G06F 40/30 |
| 2018/0032636 A1* | 2/2018 | Mullaney | G06F 40/295 |
| 2018/0060779 A1 | 3/2018 | Suri et al. | |
| 2018/0101606 A1* | 4/2018 | Montoya | G06F 16/93 |
| 2018/0189857 A1* | 7/2018 | Wu | G06F 40/30 |
| 2018/0285345 A1* | 10/2018 | Pradhan | G06F 40/284 |
| 2019/0188623 A1 | 6/2019 | Sekar et al. | |
| 2020/0250235 A1* | 8/2020 | Abhyankar | G06F 40/30 |
| 2020/0301953 A1* | 9/2020 | Abhyankar | G06F 40/247 |
| 2020/0327201 A1* | 10/2020 | Dechu | G06F 40/56 |

OTHER PUBLICATIONS

Web Page: "SAP PA And Twitter—Sentiment Analysis", Mar. 17, 2014, (10 pages).

Web Page: "Sentiment Analysis: Beyond Words", Mar. 28, 2019, (8 Pages).

Web Page: "Integrating Qualtrics Survey Data with Sap Marketing Cloud", Nov. 6, 2019, (2 Pages).

* cited by examiner

Feedback Structure 210

| Correlation ID 211 | Sentence |
|---|---|
| 12345 | "I'm having trouble adding a payment account." |
| 12347 | "The API is very slow at certain times of the day." |
| 12349 | "Great customer service." |

Item Structure 220

| Correlation ID 221 | Keyword | Sentiment Weight |
|---|---|---|
| 12345 | "having" | 0.10 |
| 12345 | "trouble" | -0.75 |
| 12345 | "adding" | -0.10 |
| 12345 | "payment" | 1.25 |
| 12345 | "account" | 1.50 |

FIG. 2B

Process = Expense Mgmt.

| Business Process Structure | | | | 230 |
|---|---|---|---|---|
| Activity | 2$^{nd}$ Activity | Significance Weight | BPID | Act. ID |
| Security | Compliance | 0.45 | 40058 | 001 |
| Tax | Audit | 0.50 | 40058 | 002 |
| Card Integration | Authorization | 0.75 | 40058 | 003 |
| Receipts | Budget | 0.65 | 40058 | 004 |

Mapped Item Structure 400

| Corr. ID | Keyword | Sentiment Weight | BPID | Act. ID | Score | Significance Weight |
|---|---|---|---|---|---|---|
| 12345 | "having" | 0.10 | 40058 | 0 | 0 | 0 |
| 12345 | "trouble" | -0.75 | 40058 | 0 | 0 | 0 |
| 12345 | "adding" | -0.10 | 40058 | 0 | 0 | 0 |
| 12345 | "payment" | 1.25 | 40058 | 003 | 1.00 | 0.75 |
| 12345 | "account" | 1.50 | 40058 | 003 | 0.8 | 0.75 |

410

Matching Score = $\sum_{i=0}^{n}$ (Significance Weight * Score of Mapped Item * Sentiment Weight)

| Feedback 510 | Process 520 | Score 530 |
|---|---|---|
| "I'm having trouble adding a payment account" | Expense Mgmt. | 1.84 |
| | Budget | 0.35 |
| | Invoicing | 0.26 |
| | Integration | 0.20 |
| | Travel | 0.00 |

User Interface 500

MAPPING TEXT CONTENT FEEDBACK TO A PROCESS VIA A SYNONYM GRAPH

BACKGROUND

Customer feedback can often provide first-hand experience with a company, a product, a service, or the like, and can be invaluable to consumers looking for products and services in the same field/area. In some cases, a web page where a product or service is listed for sale may include user-generated feedback in the form of reviews and comments. In addition, search engines provide reviews and other information in association with search results. Furthermore, social networking sites and forums provide message boards where a community of users can share feedback about a specific product or service.

However, it can be difficult for organizations (entities where the feedback is directed) to adequately harvest the feedback into useful data. For example, an organization may offer different products, services, and other aspects of the organization. Figuring out where feedback applies can be a tedious operation which involves a human reading the feedback and making a best guess as to what area the feedback applies. As a result, many organizations do not spend a great deal of time on customer feedback thereby missing out on valuable insight into their products and services.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Customer feedback is information that is provided by consumers/clients which can indicate whether they are satisfied or dissatisfied with a product or a service. In some cases, the customer feedback may be about a general experience they had with an organization or a specific part of an organization. These customer opinions are valuable resources for organizations because it provides first-hand accounts (both good and bad) about the products and services offered by the organizations. In some cases, feedback may be collected through surveys (mail, email, etc.). However, many opinions and reviews are posted online on various web-based resources such as social networking sites, search engines, merchant webpages, and many others. In some cases, organizations even create their own website/message board for gathering feedback on their products and services.

In some case, a product, an organization, a service, or the like, may have different processes involved therein. For example, a piece of software may include multiple different business processes therein that are available for use. As an example, a business management software may provide different processes for expense management, travel, invoicing, insights, data integration, support, and the like. In some cases, each process may further include multiple activities. In many cases, customer feedback is often directed at one specific business process or one specific activity within a business process. However, in order for an organization to understand what process/activity the feedback applies, they must read through the customer feedback and make an intuitive decision.

The example embodiments overcome the above-mentioned drawbacks by automatically mapping user-generated content (e.g., feedback, online post, remarks, etc.) to a process from among a plurality of processes associated with an organization. For example, the user-generated content may include an online review/post with text describing an opinion of the user, and the plurality of processes may be different business processes, different services, different products, or the like. Here, the system may map text elements from within the user-generated content to each of the plurality of different processes based on a synonym graph. As a result, the user-generated content may be respectively mapped to each possible process. The system may then determine which process has the greatest correlation with the user-generated content based on the mappings.

While some of the examples herein are directed towards an enterprise resource planning software, the example embodiments are not limited to software processes, or even to business processes. The example embodiments can be applied anywhere that textual data is to be mapped to a category data from among a plurality of categories of data. Furthermore, while some of the examples herein refer to customer feedback, it should be appreciated that any type of text content, user-generated content, etc., may be mapped using the system described herein.

Figure 1A:
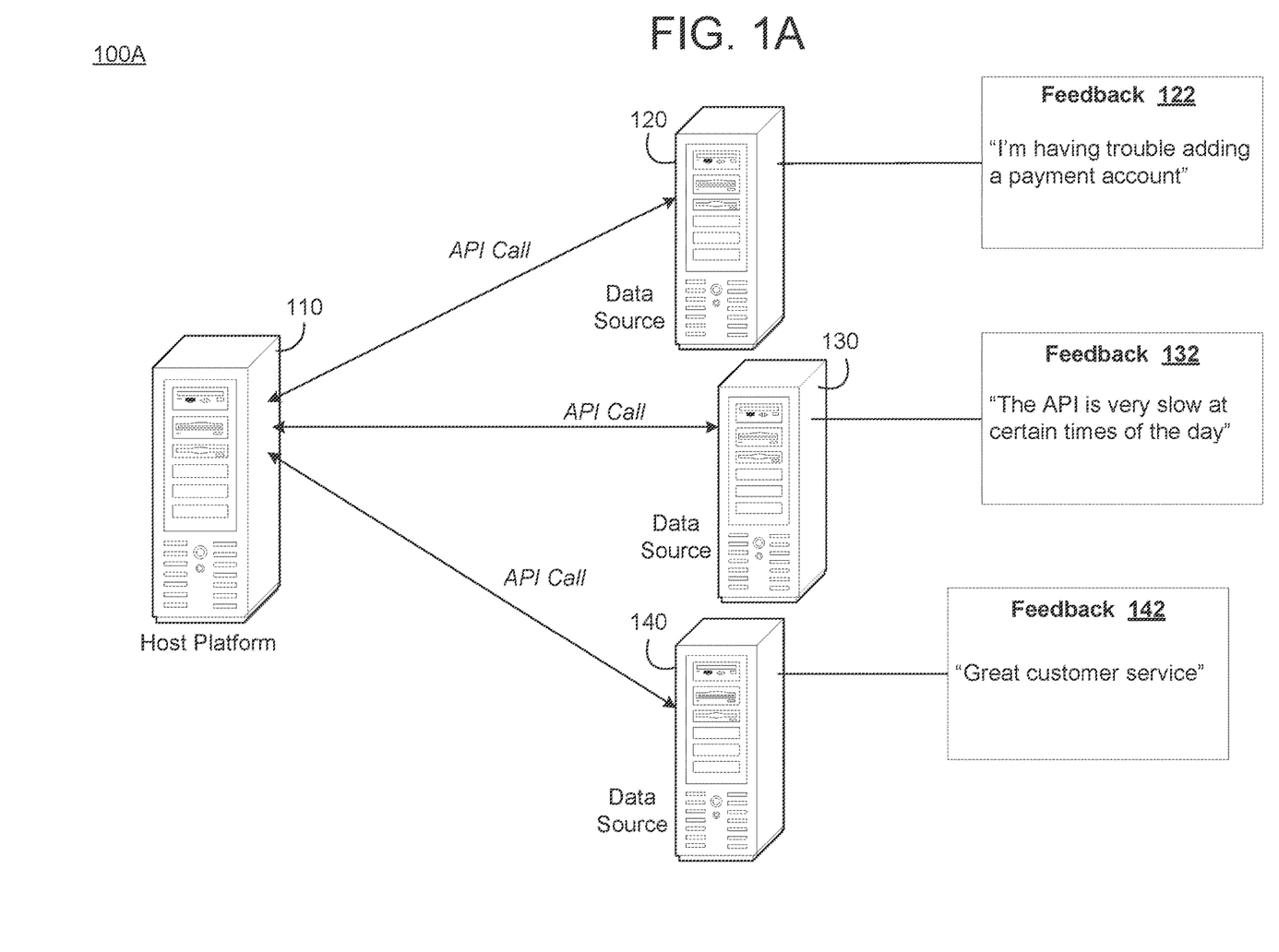
FIGS. 1A-1B are diagrams illustrating a process of mapping feedback to processes in accordance with an example embodiment.
Figure 1B:
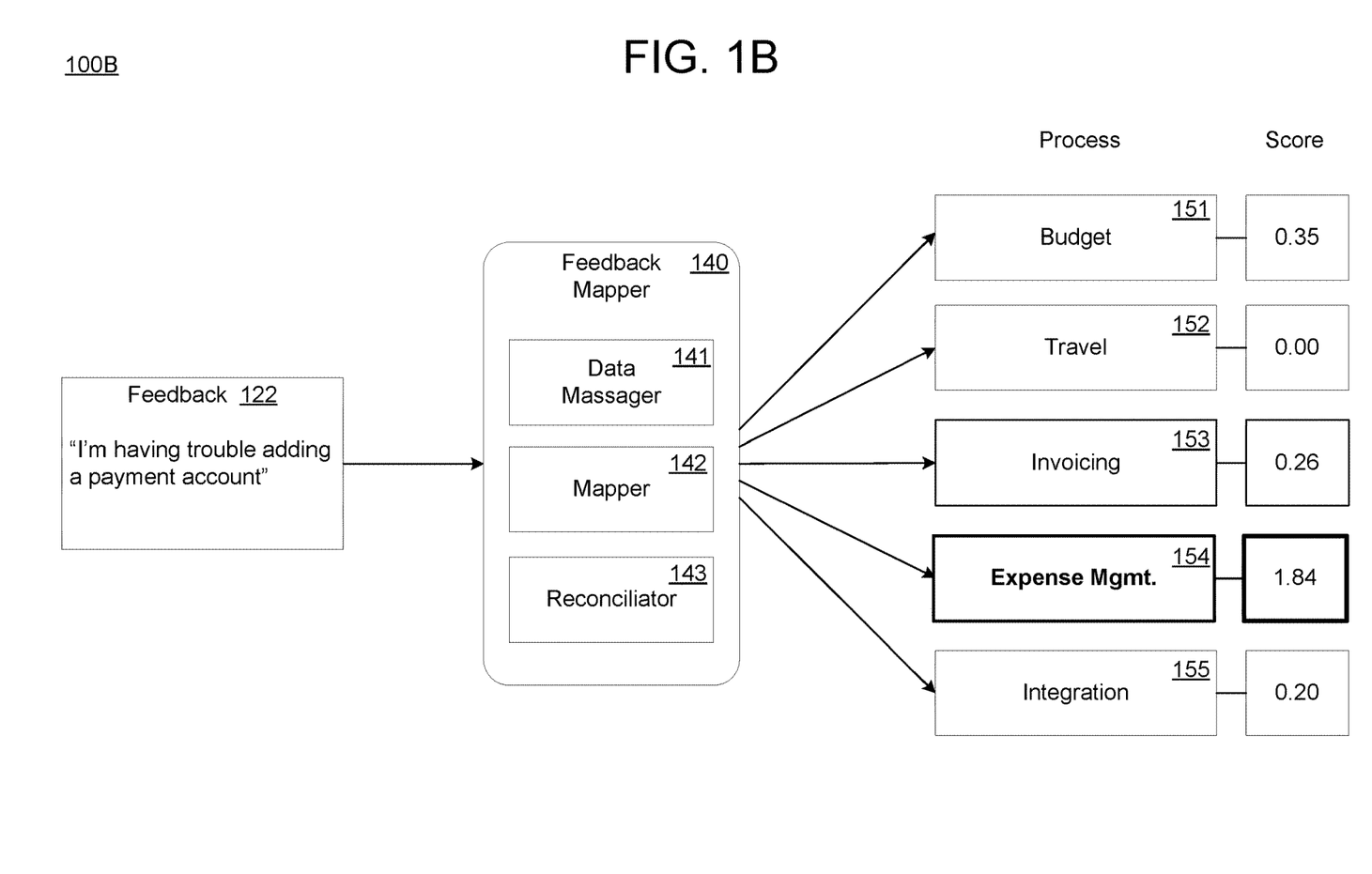

FIG. 1A illustrates a process 100A of retrieving customer feedback from online data sources in accordance with an example embodiment, and FIG. 1B illustrates a process 100B of mapping the customer feedback to a process from among a plurality of processes. Referring to FIG. 1A, a host platform 110 such as a web server, a cloud platform, a user device, an on-premises server, or the like, may retrieve user-generated content from online data sources 120, 130, and 140. For example, the online data sources 120-140 may include social networking sites (host servers thereof), search engines, mobile applications, websites, and any other site or resource where users are able to post content.

To retrieve the user generated content, the host platform 110 may issue a call to an application programming interface (API) of the respective data sources 120-140. In response, the data sources 120-140 may issue a response with the request data. The user generated content that is retrieved by the host platform 110 from the online data sources 120-140 may include text content (e.g., unstructured, structured, etc.) which includes words, phrases, sentences, characters, numbers, symbols, and the like. In some cases, the user generated content may also include images, video, audio, or the like. In the example of FIG. 1A, the host platform 110 retrieves three pieces of customer feedback including feedback 122, 132, and 142. The retrieved feedback 122, 132, and 142 may be aggregated into storage areas (e.g., tables, blobs, documents, files, pages, etc.) which are managed by the host platform 110.

Referring to FIG. 1B, a feedback mapper 140 (e.g., running on the host platform 110 shown in FIG. 1A) may process/analyze retrieved feedback 122 and determine which process from among a plurality of processes 151, 152, 153, 154, and 155 the feedback 122 belongs to. For example, the feedback mapper 140 may implement a feedback algorithm with different modules 141, 142, and 143. The feedback mapper 140 may convert the feedback into a format that can be mapped to the processes 151-155 based on a synonym graph of words (e.g., shown in FIGS. 3A-3B). As a non-limiting example, the business processes may be modeled using a standard business process management language such as Business Process Execution Language (BPEL), etc. Further the feedback may be mapped to a business process using a mapping algorithm as further described herein. The output may include a relational diagram or other form of visual representation identifying a degree of correlation/matching between each feedback and the business process it can associate to.

In the example of FIG. 1B, the feedback "I'm having trouble adding a payment account" is mapped to each of the five business processes 151, 152, 153, 154, and 155 by the feedback mapper 140. The result is a score being generated between the feedback 122 and each of the respective processes 151-155. The scores represent a strength of correlation between the feedback 122 and the respective processes 151-155. Here, the greatest score (strongest correlation) is with the process 154 (expense management).

According to various embodiments, the feedback mapper 140 may include a data massager module 141, a mapper module 142, and a reconciliatory module 143. The data massager 141 may analyze the feedback as a sentence and assign the feedback a unique correlation ID.

Figure 2A:
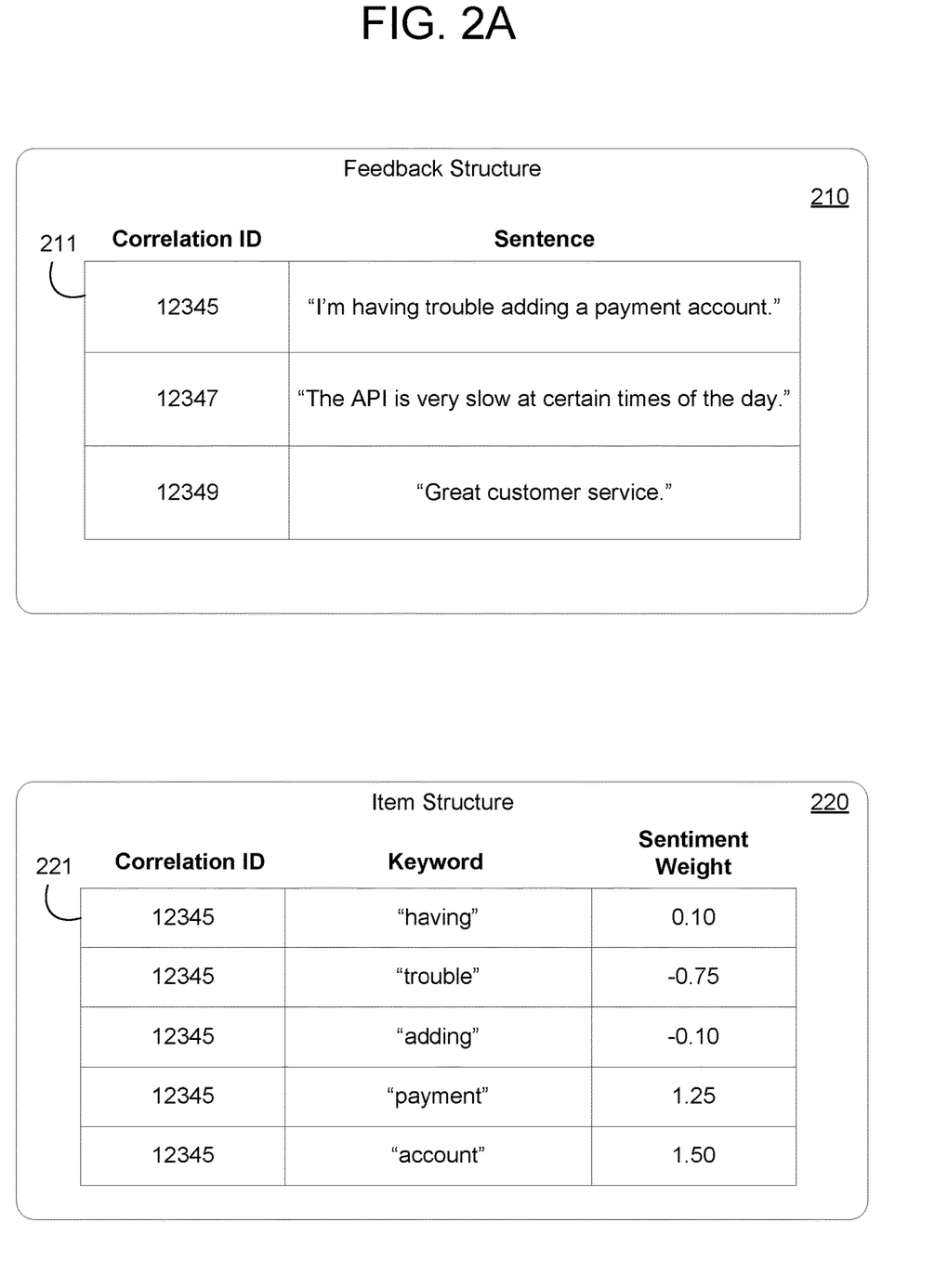
FIGS. 2A-2B are diagrams illustrating data objects which may be used for mapping feedback in accordance with an example embodiment.

Referring to FIG. 2A, the data massager module 141 may receive the feedback and store the feedback as a feedback object 211 in a data structure which is referred to herein as a feedback structure 210. Furthermore, the data massager 141 may identify words (e.g., keywords) in a sentence and transform the words into a data item referred to as an item object 221 which is stored in an item structure 220 (FIG. 2A). Each item object 221 may include a correlation ID of the sentence/feedback that the word belongs to, a weight which identifies whether a sentiment of the word is positive (positive feedback) or negative (negative feedback), and a keyword which is the word (text) itself. In some embodiments, the data massager 141 may remove some of the words from the feedback that do not provide much insight into the mapping process. Examples include, but are not limited to, prepositions, numerals, and the like.

Figure 2B:
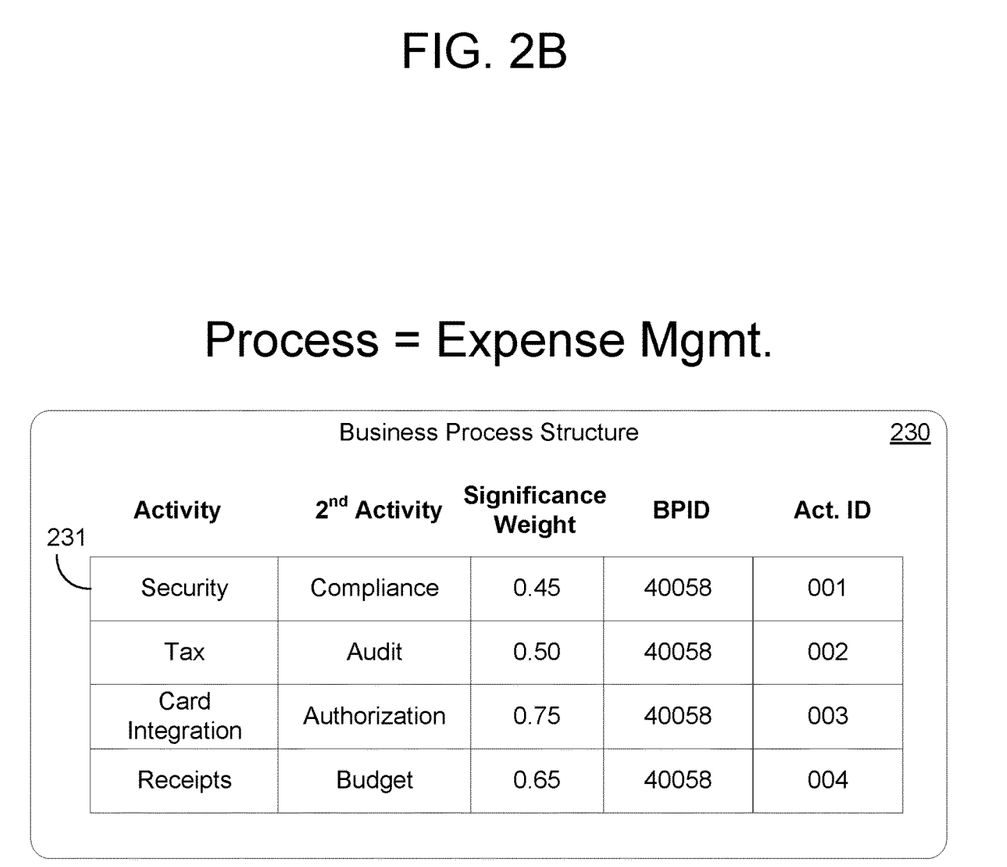

Furthermore, as shown in the example of FIG. 2B, the data massager 141 may convert each process (e.g., processes 151-155 shown in FIG. 1B) into its own business process structure 230. In the example of FIG. 2B, the business process of "expense management" includes four different activities including security, tax, card integration, and receipts. In this example, the business process structure 230 includes separate entries 231 for the four different activities that are associated with the corresponding business process of the business process structure 230. In some embodiments, each activity entry 231 may include a field for a primary task (primary activity) and a field for a secondary task (secondary activity) that the primary activity performs along with the significance weight of the activity. The business process structure 230 of the process may be generated ahead of time, or as new business processes are added to the system. In other words, the business process structures can be created in advance, while feedback can be transferred into the item objects 221 as the feedback is processed.

Referring again to FIG. 2A, the different feedbacks 122, 132, and 142, are stored as respective feedback objects 211 in the feedback structure 210. Each feedback object includes a correlation ID and the text that is included within the feedback. The data massager 141 may break up or otherwise convert the sentence of text stored within the respective feedback object into a plurality of item objects 211. In particular, the feedback sentence "I'm having trouble adding a payment account" is converted into five tokens ("having," "trouble," "adding," "payment," and "account"). Each of these words are assigned to their own item object 221 and stored in the item structure 220. Furthermore, each item object 211 includes an ID of the feedback, an identifier of the word (keyword), and a sentiment weight indicating whether the word is positive or negative feedback. Each item object 221 (entry in the item structure 220) may be stored together as shown in the example of FIG. 2A, or it may be stored separately. The sentiment weight may be predefined based on various sematic analysis.

Referring again to FIG. 2B, the process "expense management" is broken down into four different primary activities including security, tax, card integration, and receipts. Each of these activities may be stored as their own record/entry 231 in the business process structure 230. Furthermore, even though FIG. 2B only shows the structure 230 for the process "expense management," it should be appreciated that all processes may be stored in their own respective business process structures 230. In addition, each activity may include a secondary activity which is performed by the activity. The secondary activity can be used for mapping when the first/primary activity does identify a match. Each activity record 231 may further include a significance weight which represents a weight of correlation between the word/activity and the corresponding process, which in this example is "expense management." Also, each activity record 231 may include an ID of the process and an activity Id associated with the respective activity.

Figure 3A:
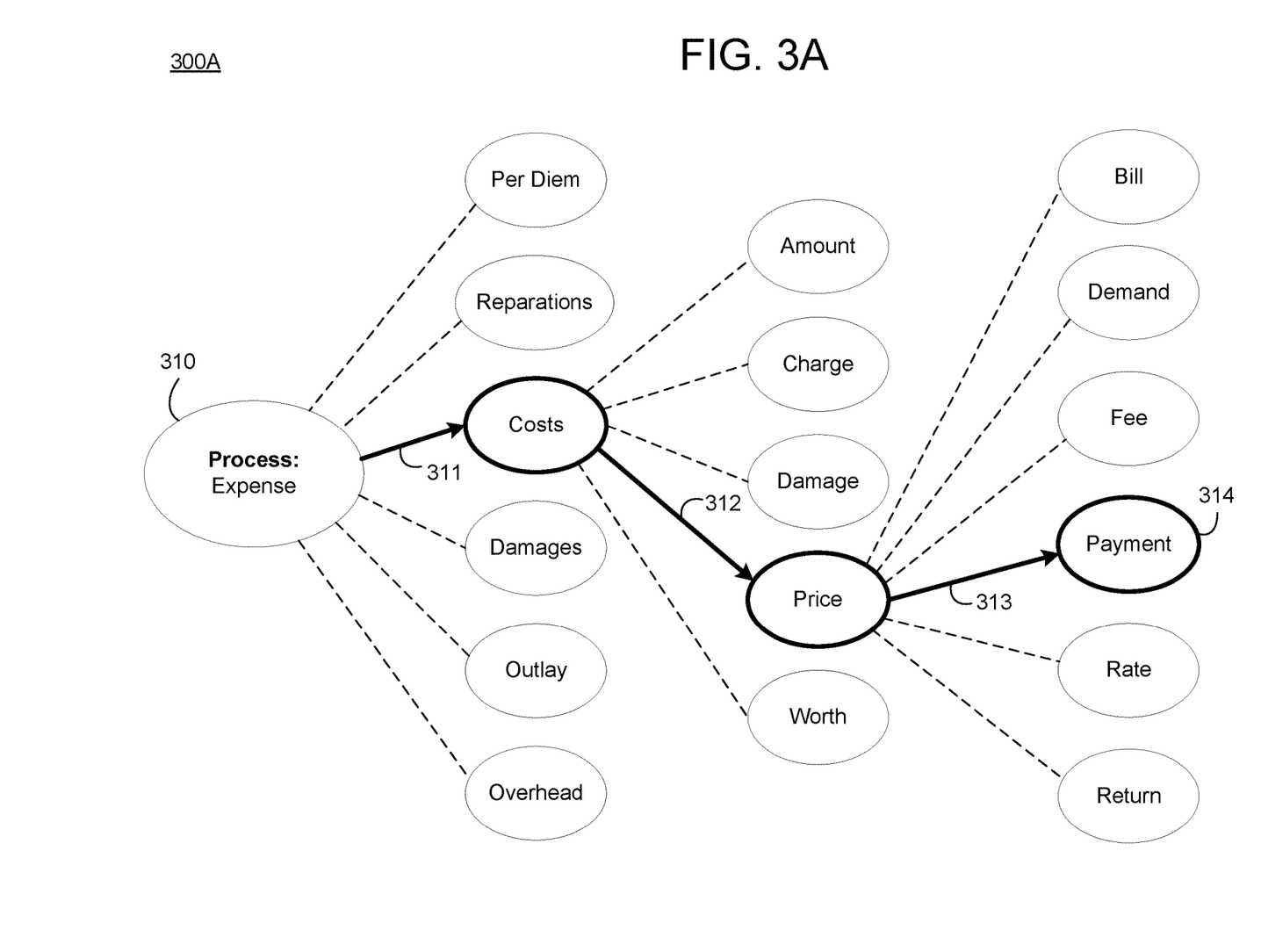
FIGS. 3A-3B are diagrams illustrating synonym graphs in accordance with example embodiments.
Figure 3B:
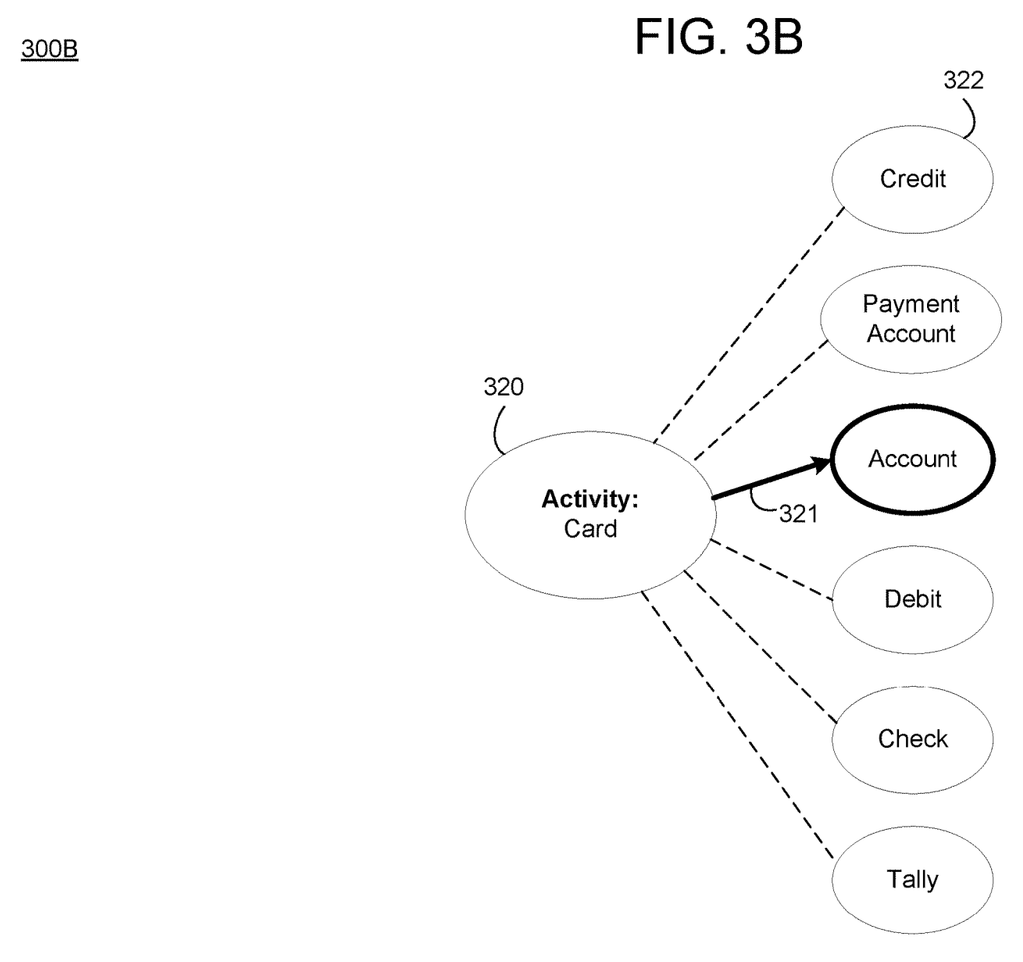

FIGS. 3A-3B illustrate examples of synonym graphs in accordance with example embodiments. In the example of FIG. 3A, a synonym graph 300A is used to map a keyword of a business process to a keyword from a user generated content (e.g., user feedback, etc.). In the example of FIG. 3B, a synonym graph 300B is used to map a keyword of an activity within a business process to a keyword from a user generated content. Below is a non-limiting example of a scoring table for use with the synonym graphs 300A and 300B.

TABLE 1

| Edges | Score |
|---|---|
| 1 | 1 |
| 2 | 0.8 |
| 3 | 0.6 |
| 4 | 0.4 |
| 5 or more | 0.0 |

As shown in Table 1, the score is assigned to a mapping of a keyword (whether it be an activity keyword or a process keyword) to a feedback keyword. The score that is assigned may depend on a number of links within the respective synonym graph between the two keywords. In the example of FIG. 3A, the keyword "expense" from the business process "expense management" may be mapped to the keyword "payment" from the feedback "I'm having trouble adding a payment account." In this example, the nodes represent words and the links represent synonym relationships. For example, a node 310 represents the keyword "expense" and a node 314 represents the keyword "payment." The links (lines) between the nodes represent synonym relationships.

For example, the feedback mapper may construct the synonym graph 300A based on synonym relationships within any known dictionary, thesaurus, etc., and include many different words that are not shown. Each link between two nodes represents a direct synonym relationship between two corresponding words represented by the nodes. Meanwhile, nodes that are connected by two or more nodes represent words that have an indirect synonym relationship. Thus, if two words are directly connected (one link) to each other, the correlation is strong between the two words than if the two words are indirectly connected with a plurality of links.

In the example of FIG. 3A, three links 311, 312, and 313 are needed to connect the keyword "expense" to the keyword "payment" within the synonym graph 300A. As a result, the mapping receives a score of 0.6. Each word within list of item objects of the feedback can individually be mapped to the respective keyword of the process. This same mapping may be performed for all processes among the plurality of processes.

As another example, the feedback keywords can be mapped to activities within a business process. For example, the feedback mapper may attempt to map the feedback keyword to a primary activity of the business process "expense management." Referring again to FIG. 2B, the primary activities include "security," "tax," "card integration," and "receipts." If the system is unable to map the keywords to a primary activity, the system can use the secondary activities and perform the mapping based thereon. Here, the secondary activities are performed as part of the primary activity and include "compliance," "audit," "authorization," and "budget," respectively.

Referring to FIG. 3B, the feedback mapper may use the synonym graph 300B to map the activity keyword "card" to the respective keywords within the feedback. In this example, a node 320 corresponding to the activity keyword "card" maps directly to a node 322 corresponding to the feedback keyword "account" via a single link 321. Thus, the score would be 1.0 for the correlation.

Figure 4:
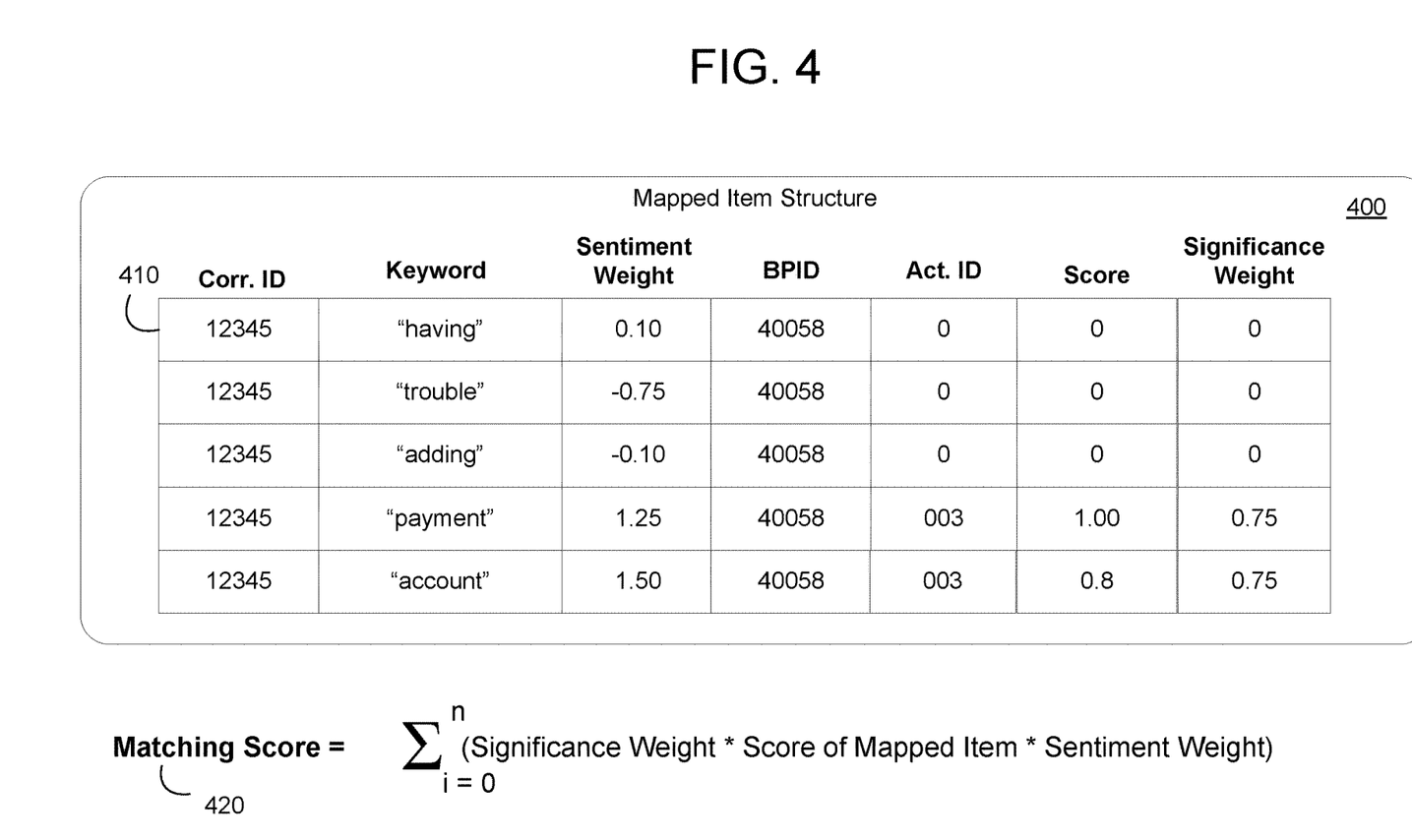
FIG. 4 is a diagram illustrating a mapped data object in accordance with an example embodiment.

When each of the keywords have been mapped, a matching score may be generated for the entire feedback. For example, FIG. 4 shows an example of a data structure referred to as mapped item structure 400 which includes a plurality of mapped item objects 410 where each mapped item object includes the item values (correlation ID, keyword, and sentiment weight) as well as a business process ID (which in this example corresponds to the expense management business process), an activity ID, and a score generated based on the links within the synonym graph 300A.

To generate a matching score 420, each of the feedback keywords (from 1 to n) are scored and then summed based on the matching score equation 420. Here, each significance weight is based on a weight assigned to the respective activity that the feedback keyword is mapped to using the business process structure 230 in FIG. 2B. In this example, the keywords "having," "trouble," and "adding" did not map to any of the activities within the business process structure 230. However, both the "payment" keyword and the "account" keyword were mapped to the activity "card integration" within the business process "expense management." The resulting value created from the matching score algorithm 420 is ((0.75*1.00*1.25)+(0.75*0.8*1.5))=1.84. Thus, the matching score of the mapping between the feedback "I'm having trouble adding a payment account" and the business process "expense management" is a score of 1.84, when rounded.

Although not shown in the figures, the same matching process can be performed between the feedback and each of the different business processes shown in FIG. 1B, to generate the scores therein. Also, it should be appreciated that the numbers, scores, values, etc., that are used herein for scoring are arbitrary numbers, and are not meant to limit the scope of the example embodiments.

Figure 5:
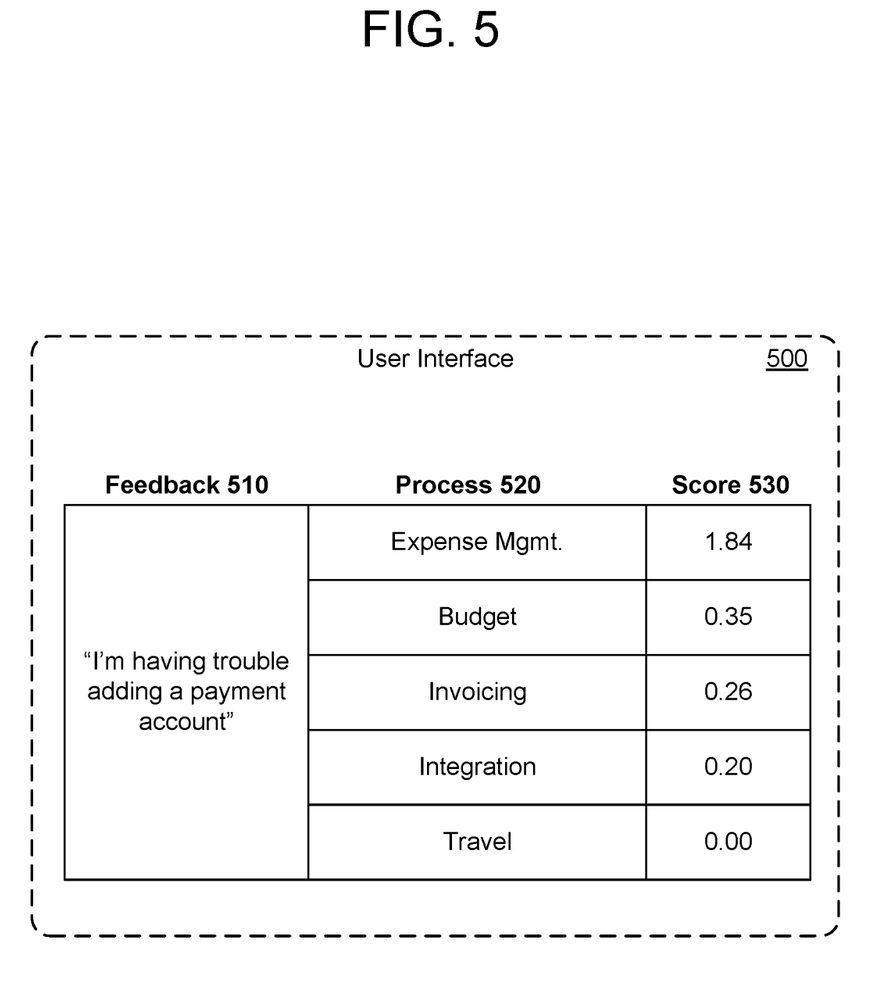
FIG. 5 is a diagram illustrating a user interface displaying feedback mapping results in accordance with an example embodiment.

FIG. 5 illustrates a user interface 500 displaying feedback mapping results in accordance with an example embodiment. Here, the feedback mapper may order the results based on the matching scores thereby providing a viewer with an easy understanding of how the feedback mapped to the respective business processes. In this example, the user interface 500 include an identification of the feedback 510, an identifier of each business process 520, and a matching score 530 thereof.

Figure 6:
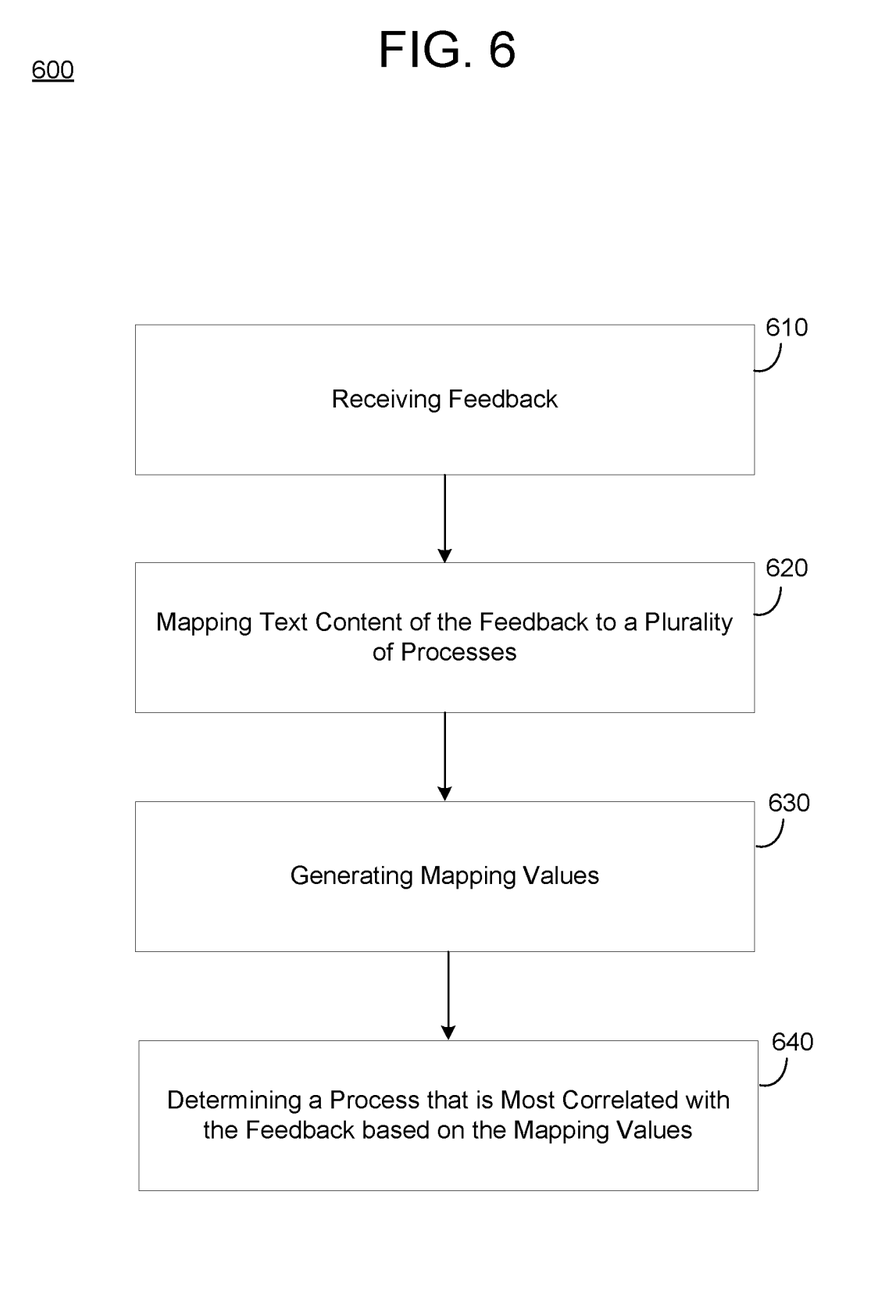
FIG. 6 is a diagram illustrating a method of mapping feedback to a process in accordance with an example embodiment.

FIG. 6 illustrates a method 600 of mapping feedback to a process in accordance with an example embodiment. For example, the method 600 may be performed by a service, an application, a program, or the like, which is executing on a host platform such as a database node, a cloud platform, a web server, an on-premises server, another type of computing system, or a combination of devices/nodes. Referring to FIG. 6, in 610, the method may include receiving text content that includes feedback. For example, the feedback may include user-generated content that is posted to a website, a message board, a mobile application, or the like. The feedback may include unstructured text such as words, sentences, and the like, which express an opinion or provide insight into a product, a service, an organization, and the like.

In 620, the method may include mapping, via execution of a mapping algorithm, the text content to a plurality of processes based on a synonym graph. For example, the mapping algorithm may identify keywords within the customer feedback and map the keywords to the different processes using the synonym graph. For example, the synonym graph may include a plurality of nodes representing a plurality of words, and links between the plurality of nodes identify synonym relationships between the corresponding plurality of words. When two words are connected directly to each other in the synonym graph, it indicates that the two words are very close in meaning (strong synonym relationship). When two words have one or more intervening words in between them in the synonym graph, it indicates a less strong relationship. Therefore, the similarity strength may be based on the number of links between two words in the synonym graph. In some embodiments, the mapping may include identifying a feedback keyword from the text content and an activity keyword from the process, and generating a path within the synonym graph between the feedback keyword to the activity keyword. In some embodiments, the mapping may include respectively mapping a plurality keywords from the text content to the word identifying the process, within the synonym graph.

In 630, the method may include generating mapping values for the plurality of processes, where a mapping value for a process is generated based on distance within the synonym graph of a mapping between a word in the text content and a word identifying the process. For example, the generating may include determining the mapping value for the process based on a number of nodes on the synonym graph between a node representing the feedback keyword and a node representing the activity keyword. Here, the less links between two mapped words in the synonym graph means a greater score/similarity therebetween. In some embodiments, the generating the mapping values may include generating sub-values for each of the plurality of keywords based on distances within the synonym graph between mappings of the plurality of keywords and the word identifying the process, and combining the sub-values to generate a mapping value of the process.

In 640, the method may include determining a process among the plurality of processes that is most correlated to the feedback based on the generated mapping values. For example, a mapped process (or activity within a process) with a greatest mapping value may indicate a strongest correlation between the customer feedback and the process. In some embodiments, the method may further include retrieving, via an application programming interface, the feedback including the text content from a social networking site. In some embodiments, the method may further include outputting, via a user interface, the text content, an identifier of a social networking site where the text content was extracted from, and the plurality of mapping values for the plurality of processes.

Figure 7:
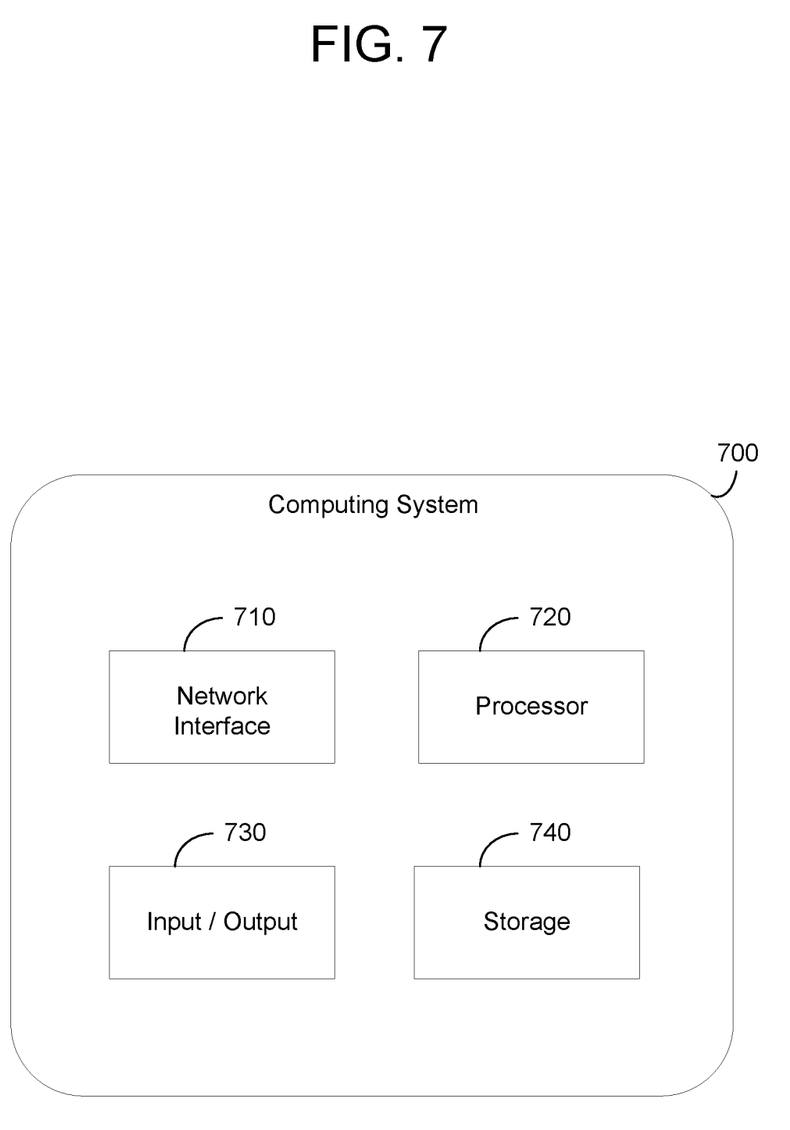
FIG. 7 is a diagram illustrating a computing system for use in the examples herein in accordance with an example embodiment.

FIG. 7 illustrates a computing system 700 that may be used in any of the methods and processes described herein, in accordance with an example embodiment. For example, the computing system 700 may be a database node, a server, a cloud platform, a user device, or the like. In some embodiments, the computing system 700 may be distributed across multiple computing devices such as multiple database nodes. Referring to FIG. 7, the computing system 700 includes a network interface 710, a processor 720, an input/output 730, and a storage device 740 such as an in-memory storage, and the like. Although not shown in FIG. 7, the computing system 700 may also include or be electronically connected to other components such as a display, an input unit(s), a receiver, a transmitter, a persistent disk, and the like. The processor 720 may control the other components of the computing system 700.

The network interface 710 may transmit and receive data over a network such as the Internet, a private network, a public network, an enterprise network, and the like. The network interface 710 may be a wireless interface, a wired interface, or a combination thereof. The processor 720 may include one or more processing devices each including one or more processing cores. In some examples, the processor 720 is a multicore processor or a plurality of multicore processors. Also, the processor 720 may be fixed or reconfigurable. The input/output 730 may include an interface, a port, a cable, a bus, a board, a wire, and the like, for inputting and outputting data to and from the computing system 700. For example, data may be output to an embedded display of the computing system 700, an externally connected display, a display connected to the cloud, another device, and the like. The network interface 710, the input/output 730, the storage 740, or a combination thereof, may interact with applications executing on other devices.

The storage device 740 is not limited to a particular storage device and may include any known memory device such as RAM, ROM, hard disk, and the like, and may or may not be included within a database system, a cloud environment, a web server, or the like. The storage 740 may store software modules or other instructions which can be executed by the processor 720 to perform the method shown in FIG. 6. According to various embodiments, the storage 740 may include a data store having a plurality of tables, partitions and sub-partitions. Here, the data store may store parity data in columnar fashion. Therefore, the storage 740 may be used to store database objects, records, items, entries, and the like.

According to various embodiments, the storage 740 may be configured to store text content (and image-related content) of previous postings.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a network interface configured to receive text content that includes user-generated feedback; and
   a processor configured to:
     identify a plurality of feedback keywords within the user-generated feedback,
     map, via execution of a mapping algorithm, the plurality of feedback keywords to a plurality of processes, respectively, based on a synonym graph,
     generate mapping values for the plurality of feedback keywords, where a mapping value is generated based on distance within the synonym graph of a mapping between a keyword in the user-generated feedback and a keyword of a process,
     determine a matching score for each of the plurality of processes based on an aggregate of the generated mapping values for the plurality of keywords of the user-generated feedback,
     determine an order of at least two processes of the plurality of processes based on corresponding matching scores for the at least two processes, and
     initiate presentation, via a user interface, of the user-generated feedback, identities of the at least two processes of the plurality of processes in the determined order, and the corresponding matching scores for each of the at least two processes.

2. The computing system of claim 1, wherein the processor is configured to identify a feedback keyword from the text content and an activity keyword from a process, and generate a path within the synonym graph between the feedback keyword to the activity keyword.

3. The computing system of claim 2, wherein the processor is configured to determine the mapping value for the process based on a number of nodes on the synonym graph between a node representing the feedback keyword and a node representing the activity keyword.

4. The computing system of claim 1, wherein the processor is further configured to retrieve, via an application programming interface, the user-generated feedback including the text content from a social networking site.

5. The computing system of claim 1, wherein the synonym graph comprises a plurality of nodes representing a plurality of words, and links between the plurality of nodes identify synonym relationships between the corresponding plurality of words.

6. The computing system of claim 1, wherein the processor is configured to generate sub-values for each of the plurality of keywords based on distances within the synonym graph of mappings between the plurality of keywords and the word identifying a process, and combine the sub-values to generate a mapping value of the respective process.

7. The computing system of claim 1, wherein the processor is further configured to output, via the user interface, an identifier of a social networking site where the user-generated feedback was extracted from.

8. The computing system of claim 1, wherein the processor is further configured to determine an impact of each keyword among the plurality of keywords on the determination and display, via a user interface, a data structure that identifies the impact of each keyword among the plurality of keywords on the determination.

9. A method comprising:
   receiving text content that includes user-generated feedback;
   identifying a plurality of feedback keywords within the user-generated feedback;
   mapping, via execution of a mapping algorithm, the plurality of feedback keywords to a plurality of processes, respectively, based on a synonym graph;
   generating mapping values for the plurality of feedback keywords, where a mapping value is generated based on distance within the synonym graph of a mapping between a keyword in the user-generated feedback and a keyword of a process;
   determining a matching score for each of the plurality of processes based on an aggregate of the generated mapping values for the plurality of keywords of the user-generated feedback;
   determining an order of at least two processes of the plurality of processes based on corresponding matching scores for the at least two processes; and
   initiating presentation, via a user interface, of the user-generated feedback, identities of the at least two processes of the plurality of processes in the determined order, and the corresponding matching scores for each of the at least two processes.

10. The method of claim 9, wherein the mapping comprises identifying a feedback keyword from the text content and an activity keyword from a process, and generating a path within the synonym graph between the feedback keyword to the activity keyword.

11. The method of claim 10, wherein the generating comprises determining the mapping value for the process based on a number of nodes on the synonym graph between a node representing the feedback keyword and a node representing the activity keyword.

12. The method of claim 9, further comprising retrieving, via an application programming interface, the user-generated feedback including the text content from a social networking site.

13. The method of claim 9, wherein the synonym graph comprises a plurality of nodes representing a plurality of words, and links between the plurality of nodes identify synonym relationships between the corresponding plurality of words.

14. The method of claim 9, wherein the generating the mapping values comprises generating sub-values for each of the plurality of keywords based on distances within the synonym graph between mappings of the plurality of keywords and the word identifying a process, and combining the sub-values to generate a mapping value of the respective process.

15. The method of claim 9, further comprising outputting, via a user interface, an identifier of a social networking site where the user-generated content was extracted from.

16. A non-transitory computer-readable medium comprising instructions which when executed by a processor cause a computer to perform a method comprising:
   receiving text content that includes user-generated feedback;
   identifying a plurality of feedback keywords within the user-generated feedback;
   mapping, via execution of a mapping algorithm, the plurality of feedback keywords to a plurality of processes, respectively, based on a synonym graph;
   generating mapping values for the plurality of feedback keywords, where a mapping value is generated based on distance within the synonym graph of a mapping between a keyword in the user-generated feedback and a keyword of a process;
   determining a matching score for each of the plurality of processes based on an aggregate of the generated mapping values for the plurality of keywords of the user-generated feedback;
   determining an order of at least two processes of the plurality of processes based on corresponding matching scores for the at least two processes; and
   initiating presentation, via a user interface, of the user-generated feedback, identities of the at least two processes of the plurality of processes in the determined order, and the corresponding matching scores for each of the at least two processes.

17. The non-transitory computer-readable medium of claim 16, wherein the mapping comprises identifying a feedback keyword from the text content and an activity keyword from a process, and generating a path within the synonym graph between the feedback keyword to the activity keyword.

18. The non-transitory computer-readable medium of claim 17, wherein the generating comprises determining the mapping value for the process based on a number of nodes on the synonym graph between a node representing the feedback keyword and a node representing the activity keyword.

19. The non-transitory computer-readable medium of claim 16, wherein the synonym graph comprises a plurality of nodes representing a plurality of words, and links between the plurality of nodes identify synonym relationships between the corresponding plurality of words.

* * * * *